United States Patent
Cheng et al.

(10) Patent No.: US 6,239,193 B1
(45) Date of Patent: May 29, 2001

(54) INK COMPOSITIONS COMPRISING A LATEX AND PROCESSES THEREOF

(75) Inventors: Chieh-Min Cheng, Rochester; Garland J. Nichols, Ontario, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/385,908

(22) Filed: Aug. 30, 1999

(51) Int. Cl.⁷ .................... C08F 220/06; C08F 220/10; C09D 11/10; C08L 33/02; C08L 33/08; C08L 33/10

(52) U.S. Cl. .................. 523/160; 524/556; 526/317.1; 526/319

(58) Field of Search ................... 523/160, 161; 106/31.27, 31.28, 31.6; 324/556, 548; 526/317.1, 319

(56) References Cited

U.S. PATENT DOCUMENTS

| | | | |
|---|---|---|---|
| 4,463,359 | 7/1984 | Ayata et al. | 346/1.1 |
| 4,524,173 * | 6/1985 | Rehfuss et al. | 524/512 |
| 4,686,260 * | 8/1987 | Lindemann et al. | 524/458 |
| 4,810,738 * | 3/1989 | Caridi | 524/317 |
| 4,840,674 | 6/1989 | Schwarz | 106/22 |
| 4,853,036 | 8/1989 | Koike et al. | 106/20 |
| 5,021,802 | 6/1991 | Allred | 346/1.1 |
| 5,041,161 | 8/1991 | Cooke et al. | 106/22 |
| 5,043,084 | 8/1991 | Gutierrez et al. | 252/47 |
| 5,065,167 | 11/1991 | You et al. | 346/1.1 |
| 5,124,718 | 6/1992 | Koike et al. | 346/1.1 |
| 5,207,825 | 5/1993 | Schwarz, Jr. | 106/22 R |
| 5,223,026 | 6/1993 | Schwarz, Jr. | 106/20 D |
| 5,242,494 * | 9/1993 | Callaghan et al. | 106/603 |
| 5,278,020 | 1/1994 | Grushkin et al. | 430/137 |
| 5,290,654 | 3/1994 | Sacripante et al. | 430/137 |
| 5,308,734 | 5/1994 | Sacripante et al. | 430/137 |
| 5,312,863 * | 5/1994 | Van Rheenen et al. | 524/555 |
| 5,461,125 * | 10/1995 | Lu et al. | 525/293 |
| 5,547,999 * | 8/1996 | Satake et al. | 522/122 |
| 5,762,695 * | 6/1998 | Wong et al. | 106/31.89 |
| 5,814,685 * | 9/1998 | Satake et al. | 523/501 |
| 5,837,043 | 11/1998 | Wong et al. | 106/31.58 |
| 5,851,274 * | 12/1998 | Lin | 106/31.43 |
| 5,891,950 * | 4/1999 | Collins et al. | 524/502 |
| 5,928,829 * | 7/1999 | Cheng et al. | 430/137 |
| 5,948,512 * | 9/1999 | Kubota et al. | 428/195 |
| 5,977,209 * | 11/1999 | Breton et al. | 523/160 |
| 5,977,210 * | 11/1999 | Patel et al. | 523/161 |

* cited by examiner

Primary Examiner—Vasu Jagannathan
Assistant Examiner—Callie E. Shosho
(74) Attorney, Agent, or Firm—E. O. Palazzo

(57) ABSTRACT

A process for the preparation of an ink which comprises mixing an ink vehicle, a colorant and a latex, and wherein said latex is generated by the polymerization of a mixture of olefinic monomers, and which polymerization is accomplished in the presence of a nonionic polyethoxylated surfactant, and which surfactant possesses an HLB value of from about 16.5 to about 21.

39 Claims, No Drawings

INK COMPOSITIONS COMPRISING A LATEX AND PROCESSES THEREOF

Disclosed in U.S. Pat. No. 5,837,043 and U.S. Pat. No. 5,762,695, the disclosures of each application being totally incorporated herein by reference in their entirety, are inks with certain surfactants. More specifically, in U.S. Pat. No. 5,762,695, there is disclosed an ink jet ink and imaging process which comprises the development of an image with an aqueous ink jet ink composition comprised of, for example, colorant, water, and resin.

The following applications, the disclosures of each being totally incorporated herein by reference, relate to ink compositions and processes thereof:

U.S. Ser. No. 09/385,207 and U.S. Ser. No. 09/385,909, both being filed concurrently herewith;

U.S. Ser. No. 09/017,533 relating to an aqueous ink containing a dissipatable polymer, colorant and a zwitterionic component like betaine;

U.S. Ser. No. 09/017,459 relating to an ink containing a colorant, polymer, such as a dissipatible polymer, vehicle, and a salt of polyacrylic, a salt of polyamic acid, a salt of alginic acid, or mixtures thereof;

U.S. Ser. No. 09/017,537 relating to an ink containing a resin of a dissipatible sulfonated polyester terminated with acrylic or methacrylic acid groups; and U.S. Pat. No. 5,938,827 relating to an ink containing a mixture of two black colorants, betaine, and N,N'-bis(3-aminopropyl) ethylenediamine.

Emulsion/aggregation/coalescence processes for the preparation of dry toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935.

The appropriate components and processes of the above applications and patents may be selected for the present invention in embodiments thereof.

BACKGROUND OF THE INVENTION

The present invention is generally directed to ink compositions, and processes thereof, and more specifically, the present invention is directed to processes for the preparation of colored aqueous ink compositions particularly suitable for use in ink jet printing processes, and especially thermal ink jet processes, and other similar processes, and wherein there is permitted minimal or no kogation, inks with suitable particle sizes, minimal intercolor bleed for the images developed, stabilized polymer latexes, and wherein paper curl is minimized and image smearing is minimal, or avoided. The inks in embodiments of the present invention are comprised of an ink vehicle, colorant, and additives, and wherein the inks can be prepared by blending a nonionic surfactant stabilized latex, and preferably a polymer or copolymer of ethylenically unsaturated monomers, wherein the ethylenically unsaturated monomers are, for example, ethylenically unsaturated esters, styrene functional monomers or olefinic acids, and a colorant dispersion, and wherein the latex can be prepared by emulsion polymerization in the presence of a nonionic surfactant with an HLB (hydrophilic/lipophilic balance) value of, for example, about 16 to about 21 and preferably from about 17.5 to about 20, and wherein the resulting inks exhibit no kogation or heater deposits when used with a nonionic surfactant stabilized latex that is designed to complement the colorant. Prevention of heater deposits/kogation enables, for example, superior ink jetting performance and enhanced life in the ink jet printhead. The latex emulsion incorporated in the ink also enables excellent ink thermal stability, hence the shelf life of the ink is not at risk, for example the ink does not readily decompose or settle for extended time periods of up to about one year.

PRIOR ART

Ink jet printing can be considered a non-impact method that produces droplets of ink that are deposited on a substrate, such as paper or transparent film, in response to an electronic digital signal. Thermal or bubble jet dropondemand ink jet printers are useful as outputs for personal computers in the office and in the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink remaining in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084, the disclosures of which are totally incorporated herein by reference.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some systems, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the ability of the ink to be stable with minimal or no settling, the ability of the ink to remain in a fluid condition in a printhead opening on exposure to air, and moreover, wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, is capable of firing a drop of ink at its intended target. Latency is the maximum idling times allowed for ink to be jetted by a printer with a speed equal to or greater than 5 m/s (equivalent to an ink traveling a distance of 0.5 millimeter in less than 100 is) without a failure. This measurement can be accomplished with the printhead or nozzles uncovered or decapped and generally at a relative humidity of about 15 percent. The time interval is usually the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain stable substantially throughout the life of the ink jet cartridge. Dye- based ink jet inks can suffer from deficiencies in waterfastness and lightfastness after being printed on various substrates. However, pigment based inks can provide images on a wide variety of substrates, and which images possess high optical density with high waterfastness and lightfastness.

There is thus a need for aqueous ink compositions and processes thereof that can be utilized in high resolution ink jet printers. Additionally, there is a need for colored, especially pigmented, inks that provide high latency and also remain stable throughout the life of the ink jet cartridge. There is also a need for pigmented inks containing stabilized latexes and which inks enable reduced kogation, and provide high optical density in a single pass. More importantly, there is a need for ink jet inks wherein paper curl, and/or image smearing can be eliminated or minimized when such inks are selected for ink jet printing processes, and wherein the images possess minimal, or acceptable intercolor bleed, that is for example, wherein color overlap, or diffusing of one color into another is minimal, or avoided; and wherein excellent waterfast and lightfast images can be generated. There and other advantages can be achievable with the present invention in embodiments thereof.

SUMMARY OF THE INVENTION

The present invention relates to ink compositions comprised of colorant, polymer, and certain additives. More specifically, the inks of the present invention are comprised of a major amount of a vehicle, like water, colorant, such as dye, pigment, or mixtures thereof, polymer, and known ink additives, such as biocides, humectants, polymeric additives, stabilizer additives, and the like.

Aspects of the present invention relate to a process for the preparation of an ink which comprises mixing an ink vehicle, a colorant and a latex, and wherein the latex is preferably generated by the polymerization of a mixture of olefinic monomers, and which polymerization is accomplished in the presence of a nonionic polyethoxylated surfactant, and which surfactant possesses an HLB value of from about 16.5 to about 21; a process wherein the latex is generated from a mixture of about 1 to about 8 monomers, and the HLB surfactant value is from about 17.5 to about 20; a process wherein the latex is generated from a mixture of from about 2 to about 4 monomers; a process wherein the olefinic monomer is a styrene acrylate, a styrene methacrylate, a methacrylate, or an acrylate; a process wherein the monomer is a terpolymer, or a copolymer; a process wherein the olefinic monomers are comprised of two monomers of an alkyl acrylate, and an alkyl methacrylate; a process wherein the olefinic monomers are comprised of an alkyl acrylate, an alkyl methacrylate, a benzyl methacrylate, an acrylonitrile, a styrene functional monomer, an acid olefinic monomer, or mixtures thereof, and wherein the styrene functional monomer is selected from the group consisting of styrene, a-methylstyrene, 4-methylstyrene, 3-chlorostyrene, 2,5-dichlorostyrene, 4-bromostyrene, 4-tert-butylstyrene, and 4-methoxystyrene; a process wherein the polymer glass transition temperature is from about 25° C. to about 80° C.; a process wherein the amine is a polyethoxylated amine surfactant with an HLB number of from about 17 to about 20, and which surfactant is a polyethoxylated alcohol, a polyethoxylated alkylated phenol, a polyethoxylated amine, a polyethoxylated amide, a full ester of aliphatic polyol, or one or more long chain fatty acids at least one of which acids contains an ethoxylated substituent group; a process wherein the surfactant possesses an HLB number of from about 17 to about 21; a process wherein the nonionic surfactant is polyethoxylated octylphenol, polyethoxylated nonylphenol, polyoxyethylene stearyl ether, polyethoxylated hydrogenated tallow amide, or polyethoxylated glyceride; a process wherein the nonionic polyethoxylated surfactant is a polyethoxylated octylphenol or a polyethoxylated glyceride; a process wherein the nonionic surfactant is selected in an amount of from about 0.5 to about 10 weight percent based on the total weight percent amount of monomers, and nonionic surfactant; a process wherein the colorant is a dye; a process wherein the colorant is a pigment; a process wherein the mixture of monomers selected enables a polymer of methyl methacrylate/butyl acrylate/acrylic acid; a process wherein the colorant possesses a particle size distribution wherein at least about 90 percent of the colorant particles have a diameter of about 0.1 µm with the remaining colorant particles being of a diameter of about 1.0 µm; a process wherein the latex contains water; a process wherein the amount of monomer selected is from about 90 to about 99.5, and the amount of nonionic polyethoxylated surfactant selected is from about 0.5 to about 10 weight percent based on the total weight percent of monomer and nonionic polyethoxylated surfactant; a process wherein there is added to the ink obtained ink additives; a process wherein the vehicle is water, a glycol, or a mixture of glycols; a process wherein the ink additives are surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which additives are present in an amount of from about 0.01 to about 7 weight percent or parts based on the total ink components; a process wherein the ink additives are comprised of a biocide, a humectant, or mixtures thereof; a high resolution printing process comprising applying in imagewise fashion to a substrate an ink composition obtained by the process illustrated herein; a process wherein the substrate is paper, and there is selected a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a process wherein subsequent to polymerization there is formed a polymer selected from the group consisting of poly(styrene-butyl acrylate-acrylic acid), poly(styrene-acrylonitrile-acrylic acid), poly(styrene-butadiene-acrylic acid), poly(styrene-vinyl acetate-acrylic acid), poly(styrene-butyl acrylate-methacrylic acid), poly(styrene-butyl acrylate), poly(benzyl methacrylate-acrylic acid), poly(benzyl methacrylate-butyl acrylate), poly(styrene-ethyl acrylate-acrylic acid), poly(butyl methacrylate-methacrylic acid), poly(benzyl methacrylate-methacrylic acid), poly(butyl acrylate-methacrylic acid), poly(methyl methacrylate-butyl acrylate-acrylic acid), poly(methyl methacrylate-butyl acrylate), poly(methyl methacrylate-acrylonitrile-acrylic acid), poly(methyl methacrylate-butadiene-acrylic acid), poly(methyl methacrylate-vinyl acetate-acrylic acid), poly(methyl methacrylate-butyl acrylate-methacrylic acid), poly(ethyl methacrylate-acrylic acid), poly(benzyl methacrylate-acrylic acid), poly(methyl methacrylate-methyl acrylate-acrylic acid), poly(methyl methacrylate-ethyl acrylate-acrylic acid), and poly(butyl methacrylate-butyl acrylate); a process wherein subsequent to polymerization there is formed a polymer selected from the group consisting of poly(methyl methacrylate-butyl acrylate-acrylic acid), poly(methyl methacrylate-butyl acrylate), poly(benzyl methacrylate-acrylic acid), poly(styrene-butyl acrylate-acrylic acid), and poly(benzyl methacrylate-methacrylic acid); a process wherein subsequent to polymerization there is preferably formed a polymer of poly(methyl methacrylate-butyl acrylate-acrylic acid); a process for the preparation of an ink which comprises contacting an ink vehicle, a colorant, and a latex, and wherein the latex is generated by the polymerization of at least two olefinic monomers, and which polymerization is accomplished in the presence of a polyethoxylated surfactant; a process wherein the surfactant is a nonionic surfactant; a process wherein the vehicle is a solvent; a process wherein the vehicle is water; a process wherein the vehicle is a glycol; and a process for the preparation of an ink which comprises mixing an ink vehicle, a colorant and a latex, and wherein the latex is generated by the polymerization of a mixture of olefinic monomers, and which polymerization is accomplished by heating in the presence of a polyethoxylated surfactant, and which surfactant possesses an HLB value of from about 17 to about 20.

The liquid vehicle is generally present in an amount of from about 50 to about 99 percent by weight, and preferably from about 55 to about 95 percent by weight, the colorant is generally present in an amount of from about 1 to about 20 percent by weight, and preferably from about 3 to about 10 percent by weight, the nonionic polyethoxylated surfactant stabilized latex polymer, or resin is generally present in an amount of from about 0.05 to about 20 percent by weight, and preferably from about 0.10 to about 10 weight percent, the biocide is generally present in an amount of from about 0 to about 10 percent by weight, and preferably from about 0.001 to about 8 percent by weight, and the humectant is generally present in an amount of from about 0 to about 50 percent by weight, and preferably from about 1 to about 30 percent by weight.

Examples of polymeric additives are gum arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines dervatized with polyethylene oxide and polypropylene oxide, which additives enhance the viscosity of the ink, and which additive is generally present in an amount of from about 0 to about 10 percent by weight, and preferably from about 0.001 to about 8 percent by weight. The invention inks may also contain a stabilizer additive such as a mixture of secondary alcohols reacted with ethylene oxide, polyethylene oxide, alkylphenoxy-polyethylene oxide, polyethylene oxide nonylphenyl ether, and which stabilizer functions, for example, in adjusting the surface or interfacial tension of the ink, and can enhance the stability of the ink, and which stabilizer is generally present in an amount of from about 0 to about 5 percent by weight, and preferably from about 1 to about 3 percent by weight, based on the total amount of components in the ink. The invention inks in embodiments possess a latency of at least about 10 to about 80 seconds in a printer with at least one nozzle of a channel width or diameter ranging, for example, from about 10 to about 40 microns, and wherein intercolor bleed is minimized or eliminated. An important property for the ink jet inks of the present invention is the latency or decap time, which is the length of time over which an ink remains fluid in a printhead opening or nozzle when exposed to air and, therefore, is capable of firing a drop of ink at its intended target. Latency is the maximum ink idling times, which ink is jetted by a printer with a speed equal to or greater than 5 m/s (equivalent to an ink traveling a distance of 0.5 millimeter in less than 100 $\mu$s) without a failure. This test is operated with the printhead or nozzles uncovered or decapped, and generally at a relative humidity of 15 percent. The time interval is the longest length of time that the printhead, uncovered, will still fire a specified drop without drop displacement or loss of density. The longer the latency time rating, the more desirable the ink.

The inks of the present invention can be prepared by the formation of a stabilized latex utilizing a nonionic surfactant and subsequently aggregating and fusing the latex polymer with a colorant. The aggregating and fusing can be accomplished as illustrated in the Xerox LUnited States patents recited herein.

Examples of nonionic polyethoxylated surfactants selected, which preferably possess an HLB number of from about 16.5 to about 21, are a polyethoxylated alcohol, a polyethoxylated alkylated phenol, a polyethoxylated amine or amide, or a full ester of aliphatic polyol and one or more long chain fatty acids at least one of which acids contains an ethoxylated substituent group. More specifically, examples of the nonionic polyethoxylated surfactants are characterized by an HLB number in the range of from about 16.5 to about 21, and preferably from about 17.5 to about 20. The HLB number is referred to in an article by W. C. Griffin *Journal Soc. Cosmetic Chemists, Volume* 5, p. 249 (1957), the disclosure of which is totally incorporated herein by reference. In this invention, the HLB number may be calculated from the expression (HIM)×20, where H is the molecular weight of the hydrophilic portion of the polyethoxylated surfactant and M is the total molecular weight of the surfactant. With respect to polyethoxylated alkylated phenol, H may be represented with sufficient accuracy by the molecular weight of the polyoxyethylene chains plus the molecular weight of the alkylated phenol.

The nonionic polyethoxylated long and/or substituted long chain fatty acid esters surfactants include polyethoxylated fatty acid esters of polyols, such as glycerol, alkylene glycols, pentaerythritol, sorbitol, mannitol and trimethylol propane, in which at least one of the esterifying long chain fatty acids contains a substituent group on its hydrophobic long chain capable of reacting with ethylene oxide to append a poly(ethylene oxide) chain, e.g. amino or hydroxy groups. Ricinoleic and 1 2-hydroxy stearic acids are examples of such substituted fatty acids and suitable surfactant compounds of this type are represented by polyethoxylated hydrogenated castor oil; and polyethoxylated partial fatty acid esters of polyols, such as glycerol, sorbitol, ethylene glycol, diethylene glycol and trimethylol propane, in which one or more of the esterifying long chain fatty acids may contain ethoxylatable substituent groups as described immediately above.

The nonionic polyethoxylated surfactant relected preferably has an HLB number of from about 17 to about 21, which surfactant is as indicated herein, and more specifically, wherein the surfactant is polyethoxylated alcohol, a polyethoxylated alkylated phenol, a polyethoxylated amine a full ester of aliphatic polyol and one or more long chain fatty acids at least one of which acids contains an ethoxylated substituent group. Commercially available surfactants that may be selected include, for example, polyethoxylated octylphenols such as Triton X-405™ (HLB 17.9) and Triton X-705™ (HLB 18.7) available from Union Carbide, IGEPAL CA-890™ (HLB 18) available from Rhodia; polyethoxylated nonylphenol, such as Tergitol NP-40™ (HLB 17.8) and Tergitol NP-50™ (HLB 18.3) available from Union Carbide, IGEPAL CO-987™ (HLB 18.6) and IGEPAL CO-997™ (HLB 19) available from Rhodia; polyethoxylated alcohols such as Brij 700™ (a polyoxyethylene stearyl ether, HLB 18.8) available from ICI, Tergitol 15-S-40™ C12-Cl4 secondary alcohol ethoxylate, HLB 18) available from Union Carbide; polyethoxylated amines and/or amides such as Rhodameen HT-50™ (HLB 17.9) available from Rhodia, Ethomid HT60™ (a polyethoxylated hydrogenated tallow amide, HLB 20) available from Akzo; polyethoxylated fatty acid esters of polyols such as Chemax CO-200™ (a polyethoxylated castor oil, HLB 18.1) available from Chemax, Varonic LI-40™ (a polyethoxylated mono- and diglyceride, HLB 19), Varonic LI-420™ (a polyethoxylated mono- and diglyceride, HLB 19), and Varonic LI-67™ (a polyethoxylated cocomonoglyceride, HLB 18) available from Witco.

The amount of the nonionic surfactant employed may vary from, for example, about 0.5 to about 10, and preferably from about 1 to about 7 weight percent based on the polymer resin contained in the polymer latex emulsion.

The nonionic polyethoxylated surfactant stabilized latex polymer can be prepared by a free radical-initiated aqueous emulsion polymerization of a mixture of ethylenically unsaturated monomers by heating at, for example, at temperatures of between about 40° C. to about 90° C., wherein the resulting latex polymer possesses, for example, a number average molecular weight of from about 3,000 grams per mole to about 800,000 grams per mole, and a weight average molecular weight of from about 5,000 grams per mole to about 1,500,000 grams per mole, and a glass temperature of from about 20° C. to about 95° C. The nonionic polyethoxylated surfactant stabilized polymer emulsion is preferably comprised of from about 1 to about 40 weight percent of polymer particles, wherein the nonionic polyethoxylated surfactant contained in the polymer emulsion is of from about 0.05 to about 10 weight percent based on the polymer resin contained in the polymer latex emulsion, and which surfactant preferably possesses an average diameter of from about 100 nanometers to about 1,000 nanometers. Examples of ethylenically unsaturated monomers include, for example, vinyl aromatic and aliphatic hydrocarbons such as styrene, α-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene, ethylenically unsaturated esters such as acrylic, methacrylic, cinnamic and crotonic and the like and esters containing fumaric and maleic type unsaturation, and acid olefinic monomers such as acrylic acid, methacrylic acid, itaconic acid, fumaric acid, maleic acid, sodium acrylate, potassium acrylate, and the like. Particularly preferred monomers include, for example, styrene, 1,3-butadiene, isoprene, alkyl (meth)acrylates such as ethyl acrylate, butyl acrylate, methyl methacrylate, butyl methacrylate, acrylonitrile, vinyl acetate, acrylic acid, and methacrylic acid. Generally, the ethylenically unsaturated ester or styrene functional monomer utilized, is selected in an amount of from about 65 to about 99 percent by weight of the resin, and the olefinic acidic monomer utilized, such as acrylic acid or methacrylic acid, is selected in an amount of from about 0 to about 25 weight percent of the resin. For example, the resin could be poly(methyl methacrylate-butyl acrylate-acrylic acid).

The free radical initiator utilized, from about 0.1 to about 12 weight percent, is generally an emulsion type initiator, such as a persulfate like potassium or ammonium persulfate, and chain transfer agents can be selected to adjust the molecular weight of the resin and for adjusting the resin particle to solubilized resin ratio. Chain transfer agents selected include alkylthiol, such as dodecanethiol, about 0.1 to about 10 percent on weight, halogenated carbons such as carbon tetrabromide, about 0.1 to about 10 percent on weight, based on the monomer, or monomers used to prepare the polymer resin, or preferably a combination of alkylthiol and halogenated carbon. Surfactants can also be incorporated into the resin emulsion such as anionic, cationic and nonionic surfactants, wherein the effective amount of anionic surfactant is from about 0.1 to about 10 percent on weight, the effective amount of nonionic surfactant is from about 0.1 to about 6 percent, the effective amount of cationic surfactant is from about 0.1 to about 5 percent on weight on weight based on the monomer, or monomers used to prepare the polymer resin.

In one specific embodiment, the nonionic polyethoxylated surfactant stabilized latex emulsion is prepared by charging a half liter kettle equipped with a mechanical stirrer with from about 200 to about 250 grams of water, about 3 to about 10 grams of polyethoxylated octylphenol nonionic surfactant, Triton X-705™ (HLB 18.7, 70 percent active, available from Union Carbide). This mixture is then stirred for about 0.5 hour at about 100 to about 200 revolutions per minute. To the resulting solution is then added about 0.1 to about 3 grams of ammonium persulfate, followed by the addition of an organic mixture containing from about 50 to about 90 grams of methyl methacrylate, about 20 to about 70 grams of butyl acrylate, about 0 to about 15 grams of acrylic acid, about 0 to about 10 grams of dodecanethiol, and from about 0 to about 5 grams of carbon tetrabromide. The mixture resulting is then heated to about 70° C. to about 80° C. (Centigrade) for a duration of, for example, from about 3 to about 16 hours. The product was then cooled to room temperature, about 22 to about 25° C. and a sample (about 10 grams) is freeze dried and analyzed by GPC resulting in a resin with a number average molecular of about 5,000 to about 500,000, a weight average molecular weight of about 10,000 to about 1,000,000 grams per mole and a polydispersity of about 2.0 to about 5; and analyzed by DSC a resin glass temperature from 25° C. to about 80° C. The latex particle size can be, for example, from about 0.2 micron to about 0.5 micron in volume average diameter as measured by Coulter Counter nanosize particle analyzer.

Embodiments of the present invention include an ink comprised of a vehicle, colorant, and nonionic polyethoxylated surfactant stabilized resin emulsion, and wherein the nonionic polyethoxylated surfactant stabilized resin emulsion contains water, nonionic polyethoxylated surfactant, and resin particles obtained from the emulsion polymerization of a mixture of olefinic monomers. Examples of monomers are ethylenically unsaturated ester, styrene functional monomers, or olefinic acidic monomers, or the mixture thereof.

Moreover, the inks of the present invention may contain penetrants of N-methylpyrrolidinone, sulfoxides, ketones, lactones, esters, alcohols, butyl carbitol, benzyl alcohol, cyclohexylpyrrolidinone, and 1,2-hexanediol, present in an amount of, for example, from about 0.01 percent to 20 percent by weight.

Also, the present invention relates to a high resolution printing process comprising applying in imagewise fashion to a substrate the invention ink in a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a printing process which comprises incorporating into an acoustic ink jet printer the invention ink with a viscosity of from about 0.7 to about 5 centipoise at a temperature of from about 25° C. to about 50° C., and causing droplets of the ink to be ejected in imagewise pattern onto a substrate; a process which comprises (a) providing a acoustic ink printer having a pool of liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, and which ink possesses a viscosity of from about 0.7 to about 5 centipoise at a temperature of from about 25° C. to about 50° C., and (b) causing droplets of the ink to be ejected onto a recording sheet in an imagewise pattern at a temperature of from about 20° C. to about 50° C.; an imaging process which comprises the development of an image with an aqueous ink jet ink composition comprised of colorant, such as dye or pigment, water, and additives as indicated herein, and wherein images with acceptable, or low intercolor bleed, photo like quality, waterfastness, for example from about 90 to about 99 percent, and minimal curling and minimal smearing are obtained; and a high resolution printing process comprising applying in imagewise fashion to a substrate in a printer having at least one nozzle of a channel width or diameter ranging from about 10 to about 40 microns. Also, the inks and imaging processes of the present invention in embodiments thereof can possess numerous advantages including excellent ink waterfastness, lighffastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable photo like quality, and low intercolor bleed, on substrates such as paper.

Examples of vehicles selected for the inks include water, glycols, mixtures of glycols, a mixture of water and a miscible organic component, such as a glycol, such as ethylene glycol, propylene glycol, diethylene glycols, glycerine, dipropylene glycols, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 50 to about 99 and preferably about 98.9 percent by weight, based on total amount of components in the ink, and more preferably from about 55 to about 95 percent by weight, and still more preferably from about 60 to about 90 percent by weight, although the amounts may be outside these ranges in embodiments. The total of all ink components is about 100 percent, or 100 parts. Also, there can be selected other vehicles not specifically recited herein.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally serves as a humectant and possesses a boiling point higher than that of water (100° C.). The colorant, such as a pigment dispersion, can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediol, 1,6 hexanediol, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, N-methylpyrrolidinone, N-cyclohexylpyrrolidinone, N,N-diethyltoluamide, and the like, ethers such as alkyl ether derivatives of alcohol, etherdiols, and ethertriols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, surfactants, pH buffer, biocides, chelating agents (EDTA, ethylene diamine tetraamine, and the like), and optional additives can also be selected for the inks.

Polymer latex examples, and which polymers are generated from the polymerization of suitable monomers, include known polymers such as poly(styrene-butyl acrylate-acrylic acid), poly(styrene-acrylonitrile-acrylic acid), poly(styrene-butadiene-acrylic acid), poly(styrene-vinyl acetate-acrylic acid), poly(styrene-butyl acrylate-methacrylic acid), poly (styrene-butyl acrylate), poly(benzyl methacrylate-acrylic acid), poly(benzyl methacrylate-butyl acrylate), poly (styrene-ethyl acrylate-acrylic acid), poly(butyl methacrylate-methacrylic acid), poly(benzyl methacrylate-methacrylic acid), poly(butyl acrylate-methacrylic acid), poly(methyl methacrylate-butyl acrylate-acrylic acid), poly (methyl methacrylate-butyl acrylate), poly(methyl methacrylate-acrylonitrile-acrylic acid), poly(methyl methacrylate-butadiene-acrylic acid), poly(methyl methacrylate-vinyl acetate-acrylic acid), poly(methyl methacrylate-butyl acrylate-methacrylic acid), poly(ethyl methacrylate-acrylic acid), poly(benzyl methacrylate-acrylic acid), poly(methyl methacrylate-methyl acrylate-acrylic acid), poly(methyl methacrylate-ethyl acrylate-acrylic acid), poly(butyl methacrylate-butyl acrylate), and preferably, poly(methyl methacrylate-butyl acrylate-acrylic acid), poly(methyl methacrylate-butyl acrylate), poly(benzyl methacrylate-acrylic acid), poly(styrene-butyl acrylate-acrylic acid), poly(benzyl methacrylate-methacrylic acid), and the like. The latex polymer, or resin is generally present in various suitable amounts, such as from about 0.05 to about 20, and preferably from about 0.10 to about 10 weight percent of the ink, and the latex size can be, for example, from about 0.1 micron to about 1 micron, and preferably from about 0.2 micron to about 0.5 micron in volume average diameter as measured by Coulter Counter nanosize particle analyzer.

The colorant for the ink compositions of the present invention includes a dye, pigment, mixtures of dye and pigment, mixture of dyes, a mixture of one or more pigments, and the like. The colorant can be black, cyan, magenta, yellow, red, blue, green, orange, brown, mixtures thereof, and the like, and is preferably carbon black, such as Levanyl carbon black obtained from Bayer. Examples of suitable black pigments include various carbon blacks such as channel black, furnace black, lamp black, and the like. Colored pigments, or dyes include red, green, blue, brown, magenta, cyan, yellow, and mixtures thereof. Illustrative examples of magenta pigments include 2,9-dimethyl-substituted quinacridone and anthraquinone, identified in the Color Index as Cl 60710, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot CSC-440L, Carbojet IJX56 and Levanyl Black A-SF. Of these, Levanyl Black A-SF, Carbojet IJX56 and Cabot CSX-440L are the most preferred. Examples of suitable colorants, especially pigments that may be selected in embodiments are illustrated in U.S. Pat. No. 5,556,727, the disclosure of which is totally incorporated herein by reference.

Examples of suitable dyes include reactive dyes, direct dyes, anionic dyes, acid dyes, food dyes, and the like. Specific examples of suitable dyes include the ProJet dyes available from Zeneca (IC) such as ProJet Yellow 1G, ProJet Yellow OAM, and ProJet Fast Yellow 2, ProJet Cyan 1, ProJet Fast Cyan 2, ProJet Magenta 3B-OA, ProJet Magenta 1T, ProJet Magenta 1, ProJet Fast Magenta 2, ProJet Fast Black 2. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon.

Preferably, the colorant, especially pigment particle size is small to enable a stable colloidal suspension of the particles in the liquid vehicle and to prevent clogging of the ink channels when the ink is used in a thermal ink jet printer. Preferred colorant particle average diameters are generally from about 0.001 to about 2 microns, and more preferably from about 0.01 to about 1 micron in volume average diameter, although the particle size can be outside these ranges. A more preferred pigment particle size includes particles having at least 70 percent of the particles being below 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

The colorant, such as pigment is present in the ink composition in various effective amounts and generally from about 1 to about 20 percent by weight, preferably from about 3 to about 10 percent by weight, more preferably from about 4 to about 9 percent by weight, and most preferably from about 4 to about 8 percent, although the amount can be outside of these ranges.

Polymeric additives which can also be added to the inks as indicated herein to, for example, enhance, such as increase, the viscosity of the ink, include water soluble polymers such as gum arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DIS-COLE® series available from DKS International, Tokyo, Japan, the JEFFAMINE® series available from Texaco, Bellaire, Tex., and the like. These polymeric additives may be present in the ink of the present invention in amounts of from about 0 to about 10 percent by weight, preferably from about 0.001 to about 8 percent by weight, and more preferably from about 0.01 to about 5 percent by weight, although the amount can be outside these ranges. A preferred polymeric additive is described in copending application U.S. Ser. No. 536,236, the disclosure of which are totally incorporated herein by reference, which additives are especially useful as pigment like carbon black stabilizers. The self- emulsifying sulfolated polyesters disclosed in U.S. Ser. No. 536,236, the disclosure of which are totally incorporated herein by reference, can be selected as additives in various appropriate amounts and preferably in amounts of from about 0.1 weight percent to about 12 weight percent and more preferably from about 1 weight percent to about 8 weight percent. The preferred polyesters have a glass transition temperature ranging from about 0° to about 80° C. and preferably between about 20° C. and about 65° C. One selected polyester is a sulfonated polyester with about 7.5 percent sulfonation, weight average molecular weight of about 2,080, $M_n$ of about 1,043, Tg of about 54.9° C., and softening point of about 135° C.

Examples of specific optional ink additives that may be selected include biocides, such as DOWICIL® 150 (o-phenylphenol), 200 (Quaternium-15), and 75 (1-(3-chloroallyl)-3,5,7-triaza-1-azoniaadamantane chloride), benzoate salts, sorbate salts, 1,2-benzisothiazolinone also known as Proxel GXL products obtained from Zeneca Chemicals and the like, present in an amount of from 0 to about 10 percent by weight, preferably from about 0.001 to about 8 percent by weight, and more preferably from about 0.01 to about 4.0 percent by weight, although the amount can be outside these ranges; penetration control additives, such as N-methylpyrrolidinone, 2-pyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 1 to about 30 percent by weight, although the amount can be outside these ranges; pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; and penetrants, as illustrated herein, such as butyl carbitol, and cyclohexylpyrrolidinone in amounts for example of from about 0.1 to about 20 percent by weight and preferably from about 0.5 to about 10 percent by weight, and the like.

Examples of other suitable ink additives include those as illustrated in U.S. Pat. No. 5,223,026 and U.S. Pat. No. 5,207,825, the disclosures of each patent being totally incorporated herein by reference. Examples of these additives include the alcohol surfactants illustrated herein, and more specifically, a mixture of secondary alcohols reacted with ethylene oxide, such Tergitol 15-S series surfactants available from Union Carbide, polyethylene oxide, alkylphenoxy-polyethylene oxide, such as Triton X-100 available from Aldrich Chemical Company, polyethylene oxide nonylphenyl ether available as IGEPAL from Aldrich Chemical Company, or as ANTAROX from Rhone Poulenc. These ink additives are present in various effective amounts, such as for example from about 0 to about 5 percent, and from 1 to about 3 weight percent by weight of the ink. For the final ink jet ink compositions of the present invention, a number of physical properties may be desirable, for example ink compositions for use in ink jet recording processes should have appropriate viscosity, surface tension and pH characteristics. The ink should possess liquid properties, such as viscosity, surface tension and pH, optimized for the discharging conditions of the printing apparatus, such as the thermal ink jet heater temperature increase, and wherein the colorant surface tension, such as pigment dispersion is, for example, greater than about 30 dynes/cm, preferably greater than about 45 dynes/cm, and more preferably greater than about 60, such as from about 70 to about 100 dynes/cm$^2$. The ink compositions of the present invention possess, for example, a surface tension of greater than about 25 dynes/cm, preferably greater than about 30 dynes/cm and more preferably greater than about 40, such as from about 40 to about 100, dynes/cm$^2$ a viscosity is of, for example, less than about 10 cps, preferably less than about 8 cps, and more preferably less than about 5 cps, such as from about 1 to about 5 cps. The surface tension can be measured with a Kruss Model K10 tensiometer, and the viscosity can be determined at about 25° C. by a Brookfield Fluid Rheometer.

The inks of the present invention possess excellent ink stability, for example they maintain a substantially constant viscosity as measured by a Brookfield Fluid Rheometer, a suitable pH as measured by a pH electrode and meter, and an effective surface tension as measured by a fluid tensiometer. Moreover, the inks do not exhibit visible pigment or emulsion particle settling behavior for extended time periods, for example over six months, and more specifically, from about six months to about two years.

The substantially constant viscosity, pH, surface tension, and lack of particulate settling is maintained despite stressing the ink by, for example, permitting the ink to remain in a bottle at room temperature, for example about 25° C., then subjecting the ink to heating at about 60° C. (Centigrade) for 24 hours or 50° C. for 30 days; or subjecting the ink to freezing at −30° C. followed by thawing at room temperature. Under these stress conditions, the viscosity of the ink does not substantially increase or decrease more than about 0.5 cPs (centipoise). A substantial viscosity change, for example from 3 centipoise (cPs) to about 4 centipoise, may cause the ink to be nonjettable, and/or may render the ink incapable of passing through the jetting device filter. An adverse change in ink viscosity may result in the lack of refilling ink to the jetting device, and thus subsequent loss of jetting channel refill and drops not being fired from the jetting device. Subjecting the inks to temperatures below about 0° C., such as −40° C., and thereafter thawing the inks, an extreme condition which may occur during transportation of the ink in winter, or cold climates, evidenced no visible ink settling or precipitate of the ink, such as the pigment, the resin emulsion particles, and pigment with other ink components. Visible settling or precipitates, after the ink has remained at 25° C., would cause ink jet nozzle clogging, and therefore, effect the line edge raggedness, optical density, or mottle of the images. Also, the settling of the ink would permit a nonhomogeneous mixture which may also cause storage problems such as in an ink tank containing a wicking device. Further, the inks of the present invention do not require additional special additives, such as the prior art sacchanine/polyols, for long shelf stability or excellent jetting performance.

The inks of the present invention possess excellent latency. Generally, the inks possess a functional latency of at least 10 seconds, more generally on the order of 20 seconds to greater than 1,000 seconds, with a minimum latency of at least about 30 seconds being preferred.

The invention inks may be applied to a suitable substrate in imagewise fashion. Application of the ink to the substrate can be accomplished by various suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

The following Examples are provided.

EVALUATIONS

The properties of the following prepared ink compositions were evaluated as follows:

A) Physical Properties:

The viscosity of the ink was measured at 25° C. using a Brookfield Model DV-11 viscometer.

The surface tension of the ink was measured at 25° C. using a Kruss model K10T plate tensiometer.

The pH was measured at 25° C. using a Coming model 345 pH meter.

B) Stability:

50 Grams of ink were placed in a capped bottle and allowed to stand at a temperature of 60° C. for 24 hours. The ink physical properties were measured after heat treatment.

For comparison, the shelf standing ink was also measured for physical properties. Large changes greater than 0.3 centipoise units for viscosity indicated instability. Other physical properties, such as surface tension or pH, were monitored, and changes of 3 dynes/cm or a change in pH by more than about 0.5 could indicate ink instability. Observation of the ink standing on the shelf at room temperature, about 25° C. throughout, for settling was also tested.

Thermal stability is also important for ink systems. Heat treatment at 60° C. for 24 hours provides an indication of the ink stability. Monitoring of the physical properties can be used for assessing the ink stability. Deviations of 0.3 or greater in viscosity can be a cause for concern as the ink properties in the printhead would change and cause nonuniformity in drops seen on printed paper. Also shelf life would be of concern if the ink does not withstand these conditions. The ink will not function as effectively should the thermal stability be degraded, for example, the inks ejection efficiency, and optical density would be decreased and phase separation of the ink would occur at the front face of the printhead.

C) Optical Density:

An image was printed by an ink jet printer HP855C on each of the following papers: Xerox Courtland 4024DP and Images Series LX. The optical density of the printed image was measured by an X-Rite densitometer.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox series 10 paper, Xerox 4024 paper, or the like, coated papers, such as those available from Jujo, transparency materials suitable for aqueous inks or ink jet printing processes, or the like.

D) Procedure for Identifying Kogation:

To monitor the kogation behavior, droplets of ink were added to an open faced heater and electrical current was applied to generate bubble formation. The pulsing was $2 \times 10^6$ pulses at 38 Volts at 2 KHz. The heater was then removed and examined underneath a microscope for heater deposit examination. In addition, the heater was rinsed with DI (deionized) water and reexamined to observe if particulates were removed. This helps to identify the severity of the depositions on the heaters. Reported herein is the before rinsing process. Having the heaters covered with debris is an early sign of kogation. When heaters are covered with debris, they will insulate the heaters, resulting in nonuniform bubble formation to generate the appropriate drop size. The image printed over the printhead and cartridge lifetime, causing streaky prints, and failure of the ink jet heaters.

EXAMPLE I

A nonionic surfactant stabilized latex emulsion comprised of a nonionic polyethoxylated octylphenol surfactant Triton X-705™ with an HLB of 18.7 and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.36 gram of ammonium persulfate, 5.8 grams of polyethoxylated octylphenol nonionic surfactant, Triton X-705™ (70 percent active, available from Union Carbide), and 232 grams of deionized water were deaerated in this 500 milliliter jacketed glass flask for 30 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 6 hours in a nitrogen atmosphere. The resulting latex polymer, poly(methyl methacrylate-butyl acrylate-acrylic acid), after cooling throughout possessed an weight average molecular weight $M_w$ of 660,000, and a number average molecular weight $M_n$ of 163,000, as determined on a Waters GPC, and a glass transition temperature of 55° C., as measured on a Seiko DSC. The latex polymer, or latex resin possessed a volume average diameter for the polymer of 385 nanometers as measured by light scattering technique on a Coulter N4 Plus Particle Sizer. The resin emulsion product was comprised of 34.5 percent by weight of poly(methyl methacrylate-butyl acrylate-acrylic acid) resin, 1.0 percent by weight of polyethoxylated octylphenol nonionic surfactant Triton X-705™, and 64.5 percent by weight of water.

EXAMPLE IA

An ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion of Example I (the emulsion was comprised of 34.5 percent by weight of poly(methyl methacrylate-butyl acrylate-acrylic acid) resin, 1.0 percent by weight of polyethoxylated octylphenol nonionic surfactant Triton X-705™, and 64.5 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 μm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of the nonionic surfactant Triton X-705™ stabilized poly(methyl methacrylate-butyl acrylate-acrylic acid) resin emulsion, and 66.4 percent by weight of water.

EXAMPLE II

A nonionic surfactant stabilized latex emulsion comprised of a nonionic polyethoxylated octylphenol surfactant Triton X-705™ with a HLB of 18.7 and polymer particles derived from emulsion polymerization of styrene, butyl acrylate, acrylic acid, 50145/5 parts (by weight), was prepared as follows.

In a 500 milliliter jacketed glass flask equipped with a mechanical stirrer, 0.5 grams of ammonium persulfate, 5.8 grams of polyethoxylated octylphenol nonionic surfactant, Triton X-705™ (70 percent active, available from Union Carbide), and 232 grams of deionized water were deaerated in this 500 milliliter jacketed glass flask for 30 minutes. A monomer mixture of 60 grams of methyl methacrylate, 54 grams of butyl acrylate, and 6 grams of acrylic acid, was charged into the flask and the resulting mixture was emulsified for 10 minutes at room temperature, about 25° C. throughout. The resulting emulsion was then polymerized at 80° C. for 7 hours in a nitrogen atmosphere. The resulting latex polymer, poly(methyl methacrylate-butyl acrylate-acrylic acid), after cooling throughout possessed an weight average molecular weight $M_w$ of 704,000, and a number average molecular weight $M_n$ of 92,000, as determined on a Waters GPC, and a glass transition temperature of 26° C., as measured on a Seiko DSC. The latex polymer, or latex resin possessed a volume average diameter for the polymer of 359 nanometers as measured by light scattering technique on a Coulter N4 Plus Particle Sizer. The resin emulsion product was comprised of 34.7 percent by weight of poly(methyl methacrylate-butyl acrylate-acrylic acid) resin, 1.0 percent by weight of polyethoxylated octylphenol nonionic surfactant Triton X-705™, and 64.3 percent by weight of water.

EXAMPLE IIA

An ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion derived from Example II (the emulsion 34.7 percent by weight of poly(methyl methacrylate-butyl acrylate-acrylic acid) resin, 1.0 percent by weight of polyethoxylated octylphenol nonionic surfactant Triton X-705™, and 64.3 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 µm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant Triton X-705™ stabilized poly(methyl methacrylate-butyl acrylate-acrylic acid) resin emulsion, and 66.4 percent by weight of water.

EXAMPLE III

A nonionic surfactant stabilized latex emulsion comprised of a nonionic polyethoxylated octylphenol surfactant Triton X-405™ with a HLB of 17.9 and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.6 gram of ammonium persulfate, 7.65 grams of polyethoxylated octylphenol nonionic surfactant, Triton X-405™ (70 percent active, available from Union Carbide), and 232 grams of deionized water were deaerated in this 500 milliliter jacketed glass flask for 30 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 6 hours in a nitrogen atmosphere. The resulting latex polymer, poly(methyl methacrylate-butyl acrylate-acrylic acid), after cooling throughout possessed an weight average molecular weight $M_w$ of 448,000, and a number average molecular weight $M_n$ of 112,000, as determined on a Waters GPC, and a glass transition temperature of 55° C., as measured on a Seiko DSC. The latex polymer, or latex resin possessed a volume average diameter for the polymer of 445 nanometers as measured by light scattering technique on a Coulter N4 Plus Particle Sizer. The resin emulsion product was comprised of 33.3 percent by weight of poly(methyl methacrylate-butyl acrylate-acrylic acid) resin, 1.5 percent by weight of polyethoxylated octylphenol nonionic surfactant Triton X-405™, and 65.2 percent by weight of water.

EXAMPLE IIIA

An ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion derived from Example III (the emulsion 33.3 percent by weight of poly(methyl methacrylate-butyl acrylate-acrylic acid) resin, 1.5 percent by weight of polyethoxylated octylphenol nonionic surfactant Triton X-405™, and 65.2 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 µm glass fiber filter. The resulting ink was comprised of 7 percent by weight of Levanyl A-SF carbon black, 20 percent by weight of suffolane, 5 percent by weight of trimethylopropane, 0.1 percent by weight of triethanolamine, 1.5 percent by weight of nonionic surfactant Triton X-405™ stabilized poly(methyl methacrylate-butyl acrylate-acrylic acid) resin emulsion, and 66.4 percent by weight of water.

EXAMPLE IV

A nonionic surfactant stabilized latex emulsion comprised of a nonionic polyethoxylated nonylphenol surfactant IGEPAL CO-997™ with an HLB of 19.0 and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.6 gram of ammonium persulfate, 8.1 grams of polyethoxylated nonylphenol nonionic surfactant, IGEPAL CO-997™ (70 percent active, available from Rhodia), and 232 grams of deionized water were deaerated in this 500 milliliter jacketed glass flask for 60 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 6 hours in a nitrogen atmosphere. The resulting latex polymer, poly(methyl methacrylate-butyl acrylate-acrylic acid), after cooling throughout possessed an weight average molecular weight $M_w$ of 500,000, and a number average molecular weight $M_n$ of 120,000, as determined on a Waters GPC, and a glass transition temperature of 55° C., as measured on a Seiko DSC. The latex polymer, or latex resin possessed a volume average diameter for the polymer of 438 nanometers as measured by light scattering technique on a Coulter N4 Plus Particle Sizer. The resin emulsion product was comprised of 33.8 percent by weight of poly(methyl methacrylate-butyl acrylate-acrylic acid) resin, 1.5 percent by weight of polyethoxylated nonylphenol nonionic surfactant Igepal CO-997™, and 64.7 percent by weight of water.

EXAMPLE IVA

An ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion generated by the process of Example IV (33.8 percent by weight of poly(methyl methacrylate-butyl acrylate-acrylic acid) resin, 1.5 percent by weight of polyethoxylated nonylphenol nonionic surfactant IGEPAL CO-997™, and 64.7 percent by weight of water) was prepared by the addition of sulfolane, trimethylopropane, triethanolamine and resin emulsion Din water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 gm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant IGEPAL GO-997™ stabilized poly(methyl methacrylate-butyl acrylate-acrylic acid) resin emulsion, and 66.4 percent by weight of water.

EXAMPLE V

A nonionic surfactant stabilized latex emulsion comprised of a nonionic polyethoxylated alcohol surfactant Brij 700™ with an HLB of 18.8 and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.6 gram of ammonium persulfate, 8.1 grams of polyethoxylated stearyl ether nonionic surfactant, Brij 700™ (100 percent active, available from ICI Surfactants), and 232 grams of deionized water were deaerated in this 500 milliliter jacketed glass flask for 60 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 7 hours in a nitrogen atmosphere. The resulting latex polymer, poly(methyl methacrylate-butyl acrylate-acrylic acid), after cooling throughout possessed an weight average molecular weight $M_w$ of 797,000, and a number average molecular weight $M_n$ of 124,000, as determined on a Waters GPC, and a glass transition temperature of 51° C., as measured on a Seiko DSC. The latex polymer, or latex resin possessed a volume average diameter for the polymer of 399 nanometers as measured by light scattering technique on a Coulter N4 Plus Particle Sizer. The resin emulsion product was comprised of 34.3 percent by weight of poly(methyl methacrylate-butyl acrylate-acrylic acid) resin, 2.0 percent by weight of polyethoxylated stearyl ether nonionic surfactant Brij 700™, and 63.7 percent by weight of water.

EXAMPLE VA

An ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion obtained from Example V (34.3 percent by weight of poly (methyl methacrylate-butyl acrylate-acrylic acid) resin, 2.0 percent by weight of polyethoxylated stearyl ether nonionic surfactant Brij 700™, and 63.7 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 μm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant Brij 770™ stabilized poly(methyl methacrylate-butyl acrylate-acrylic acid) resin emulsion, and 66.4 percent by weight of water.

EXAMPLE VI

A nonionic surfactant stabilized latex emulsion comprised of a nonionic surfactant polyethoxylated fatty acid esters of polyols Varonic LI-420™ (a polyethoxylated mono- and diglyceride with an HLB 19.0) and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.6 gram of ammonium persulfate, 12.2 grams of polyethoxylated fatty acid esters of polyols nonionic surfactant, Varonic LI-420™ (100 percent active, available from Witco), and 232 grams of deionized water were deaerated in this 500 milliliter jacketed glass flask for 60 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 8 hours in a nitrogen atmosphere. The resulting latex polymer, poly(methyl methacrylate-butyl acrylate-acrylic acid), after cooling throughout possessed an weight average molecular weight $M_w$ of 604,000, and a number average molecular weight $M_n$ of 159,000, as determined on a Waters GPC, and a glass transition temperature of 54° C., as measured on a Seiko DSC. The latex polymer, or latex resin possessed a volume average diameter for the polymer of 467 nanometers as measured by light scattering technique on a Coulter N4 Plus Particle Sizer. The resin emulsion product was comprised of 34.2 percent by weight of poly(methyl methacrylate-butyl acrylate-acrylic acid) resin, 3.0 percent by weight of polyethoxylated fatty acid esters of polyols nonionic surfactant, Varonic LI-420™, and 62.8 percent by weight of water.

EXAMPLE VIA

An ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion derived from Example VI (34.2 percent by weight of poly (methyl methacrylate-butyl acrylate-acrylic acid) resin, 3.0 percent by weight of polyethoxylated fatty acid esters of polyols nonionic surfactant, Varonic LI-420™, and 62.8 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 μm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant Varonic LI-420™ stabilized poly(methyl methacrylate-butyl acrylate-acrylic acid) resin emulsion, and 66.4 percent by weight of water.

COMPARATIVE EXAMPLE 1

A comparative nonionic surfactant stabilized latex emulsion comprised of a nonionic polyethoxylated octylphenol surfactant Triton X-100 ™ with an HLB of 13.5 and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.36 gram of ammonium persulfate, 3.3 grams of polyethoxylated octylphenol nonionic surfactant, Triton X-100™ (100 percent active, available from Union Carbide), and 232 grams of deionized water were deaerated in this 500 milliliter jacketed glass flask for 30 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 6 hours in a nitrogen atmosphere. The resulting latex polymer, poly(methyl methacrylate-butyl acrylate-acrylic acid), after cooling throughout possessed an weight average molecular weight $M_w$ of 760,000, and a number average molecular weight $M_n$ Of 193,000, as determined on a Waters GPC, and a glass transition temperature of 55° C., as measured on a Seiko DSC. The latex polymer, or latex resin possessed a volume average diameter for the polymer of 437 nanometers as measured by light scattering technique on a Coulter N4 Plus Particle Sizer. The resin emulsion product was comprised of 34.2 percent by weight of poly(methyl methacrylate-butyl acrylate-acrylic acid) resin, 0.8 percent by weight of polyethoxylated octylphenol nonionic surfactant Triton X-100r, and 65.0 percent by weight of water.

COMPARATIVE EXAMPLE 1A

A comparative ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion of Comparative Example I (34.2 percent by weight of poly(methyl methacrylate-butyl acrylate-acrylic acid) resin, 0.8 percent by weight of polyethoxylated octylphenol nonionic surfactant Triton X-100™, and 65.0 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 μm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant Triton X-100™ stabilized poly (methyl methacrylate-butyl acrylate-acrylic acid) resin emulsion, and 66.4 percent by weight of water.

COMPARATIVE EXAMPLE 2

A comparative nonionic surfactant stabilized latex emulsion comprised of a nonionic polyethoxylated nonylphenol surfactant IGEPAL CO-850™ with an HLB of 16.0 and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.6 gram of ammonium persulfate, 6.1 grams of polyethoxylated nonylphenol nonionic surfactant, IGEPAL CO-850™ (100 percent active, available from Rhodia), and 232 grams of deionized water were deaerated in this 500 milliliter jacketed glass flask for 30 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 6.5 hours in a nitrogen atmosphere. The resulting latex polymer, poly(methyl methacrylate-butyl acrylate-acrylic acid), after cooling throughout possessed an weight average molecular weight $M_w$ of 593,000, and a number average molecular weight $M_n$ of 142,000, as determined on a Waters GPC, and a glass transition temperature of 53° C., as measured on a Seiko DSC. The latex polymer, or latex resin possessed a volume average diameter for the polymer of 388 nanometers as measured by light scattering technique on a Coulter N4 Plus Particle Sizer. The resin emulsion product was comprised of 34.2 percent by weight of poly(methyl methacrylate-butyl acrylate-acrylic acid) resin, 1.5 percent by weight of polyethoxylated nonylphenol nonionic surfactant IGEPAL CO-850™, and 64.3 percent by weight of water.

COMPARATIVE EXAMPLE 2A

A comparative ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion derived from Comparative Example II (34.2 percent by weight of poly(methyl methacrylate-butyl acrylate-acrylic acid) resin, 1.5 percent by weight of polyethoxylated nonylphenol nonionic surfactant IGEPAL CO-850™, and 64.3 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 μm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant IGEPAL CO-850™ stabilized poly (methyl methacrylate-butyl acrylate-acrylic acid) resin emulsion, and 66.4 percent by weight of water.

COMPARATIVE EXAMPLE 3

A nonionic surfactant stabilized latex emulsion comprised of a nonionic surfactant polyethoxylated fatty acid esters of polyols Varonic LI-42™ (a polyethoxylated mono- and diglyceride with an HLB 13.0) and polymer particles derived from emulsion polymerization of styrene, butyl acrylate, acrylic acid, 67/30/3 parts (by weight), was prepared as follows.

In a 500 milliliter jacketed glass flask equipped with a mechanical stirrer, 0.6 gram of ammonium persulfate, 12.2 grams of polyethoxylated fatty acid esters of polyols nonionic surfactant, Varonic LI-42™ (100 percent active, available from Witco), and 232 grams of deionized water were deaerated in this 500 milliliter jacketed glass flask for 60 minutes. A monomer mixture of 80.4 grams of methyl methacrylate, 36 grams of butyl acrylate, and 3.6 grams of acrylic acid, was charged into the flask and the resulting mixture was emulsified for 10 minutes at room temperature, about 25° C. throughout. This emulsion was then polymerized at 80° C. for 7.5 hours in a nitrogen atmosphere. The resulting latex polymer, poly(methyl methacrylate-butyl acrylate-acrylic acid), after cooling throughout possessed an weight average molecular weight $M_w$ of 562,000, and a number average molecular weight $M_n$ of 131,000, as determined on a Waters GPC, and a glass transition temperature of 51° C., as measured on a Seiko DSC. The latex polymer, or latex resin possessed a volume average diameter for the polymer of 421 nanometers as measured by light scattering technique on a Coulter N4 Plus Particle Sizer. The resin emulsion product was comprised of 34.0 percent by weight of poly(methyl methacrylate-butyl acrylate-acrylic acid) resin, 3.0 percent by weight of polyethoxylated fatty acid esters of polyols nonionic surfactant, Varonic LI-42™, and 63.0 percent by weight of water.

COMPARATIVE EXAMPLE 3A

A comparative ink comprised of 7 percent by weight of Levanyl A-SF carbon black obtained from Bayer Corporation, 20 percent by weight of sulfolane (obtained from Bayer), 5 percent by weight of trimethylopropane, 0.1 percent by weight of triethanolamine, and 1.5 percent by weight of the emulsion of Comparative Example III (34.0 percent by weight of poly(methyl methacrylate-butyl acrylate-acrylic acid) resin, 3.0 percent by weight of polyethoxylated fatty acid esters of polyols nonionic surfactant, Varonic LI-42™, and 63.0 percent by weight of water) was prepared by the addition of sulfolane, trimethylopropane, triethanolamine and resin emulsion in water through simple agitation using a stir bar for about 15 minutes. The resulting mixture was added to a stirring solution of Levanyl A-SF carbon black. The ink mixture resulting was stirred with a stir bar for about 5 to about 10 minutes, and the resulting ink mixture was filtered through a 1 μm glass fiber filter. The resulting ink was comprised of 7 percent by weight of Levanyl A-SF carbon black, 20 percent by weight of sulfolane, 5 percent by weight of trimethylopropane, 0.1 percent by weight of triethanolamine, 1.5 percent by weight of nonionic surfactant Varonic LI-42™ stabilized poly (methyl methacrylate-butyl acrylate-acrylic acid) resin emulsion, and 66.4 percent by weight of water.

Results:

TABLE

All Properties Measured at 25° C.

| Ink ID | Viscosity Cps | Surface tension dyne/cm | pH | Optical density LX | Heater deposits Rating <3 is excellent, >3 is poor |
|---|---|---|---|---|---|
| Example IA | 2.36 | 47.2 | 6.70 | 1.35 | 1 |
| After heat treatment 60° C./24 hr | 2.44 | 46.2 | 6.75 | 1.36 | 1 |
| Example IIA | 2.56 | 46.0 | 6.66 | 1.36 | 1 |
| After heat treatment 60° C./24 hr | 2.71 | 45.8 | 6.78 | 1.34 | 2 |
| Example IIIA | 2.70 | 40.3 | 6.32 | 1.33 | 2 |
| After heat treatment 60° C./24 hr | 2.74 | 39.8 | 6.39 | 1.35 | 2 |
| Example IVA | 2.55 | 45.8 | 6.12 | 1.33 | 1 |
| After heat treatment 60° C./24 hr | 2.61 | 45.6 | 6.19 | 1.34 | 1 |
| Example VA | 2.45 | 46.8 | 6.58 | 1.35 | 2 |
| After heat treatment 60° C./24 hr | 2.57 | 47.9 | 6.70 | 1.37 | 2 |
| Example VIA | 2.46 | 46.5 | 6.45 | 1.34 | 1 |
| After heat treatment 60° C./24 hr | 2.48 | 46.8 | 6.54 | 1.35 | 1 |
| Comparative 1A | 2.52 | 45.6 | 6.27 | 1.30 | 7 |
| After heat treatment 60° C./24 hr | 3.19 | 42.3 | 6.55 | 1.27 | 8 |
| Comparative 2A | 2.53 | 44.7 | 6.17 | 1.34 | 8 |
| After heat treatment 60° C./24 hr | 3.28 | 41.4 | 6.63 | 1.28 | 8 |
| Comparative 3A | 2.59 | 44.9 | 6.41 | 1.33 | 7 |
| After heat treatment 60° C./24 hr | 3.28 | 41.0 | 6.83 | 1.24 | 8 |

Rating: 1 = about 0–0.5% coverage of deposits on the heaters.
2 = about 0.05–5% coverage of deposits on the heaters.
7 = about 90% coverage of deposits on the heaters.
8 = about 95% coverage of deposits and thicker layer of deposits on the heaters.

In the above Examples, the invention inks exhibit excellent stability at room temperature and also when subjected to a 60° C. heat treatment. Large changes greater than about 0.3 centipoise units for viscosity indicated ink instability. Other physical properties, such as surface tension and pH, were monitored, and changes of 3 dynes/cm or a change in pH by more than about 0.5 would indicate ink instability. All the invention inks are shelf stable with no evidence of settling or precipitates for at least 8 months at about 25° C. (The substantially constant viscosity, pH, and surface tension, is maintained despite stressing the ink invention by, permitting the ink to remain in a bottle at room temperature, for example about 25° C., then subjecting the ink to heating at about 60° C. (Centigrade) for 24 hours. Under these stress conditions, the viscosity of the invention inks does not substantially increase or decrease more than about 0.5 cPs (centipoise), and the surface tension of the ink does not substantially increase or decrease more than about 1 dyne/cm). The ink physical properties were measured after 60° C. heat treatment. Large changes greater than 0.3 centipoise units for viscosity indicated instability. Other physical properties, such as surface tension or pH, were monitored, and changes of 3 dynes/cm or a change in pH by more than about 0.5 would indicate instability.

Summary

From the above Table, the six Examples where the ink contained the invention nonionic polyethoxylated surfactant, wherein the HLB number is of about 17.5 to about 20, with the inks exhibited excellent thermal stability with no change in viscosity. The rating for 1 and 2 indicate that essentially no heater deposits were seen on the heaters after the kogation procedure was performed. The use of a nonionic polyethoxylated surfactant stabilized polymer emulsion combined with the appropriate colorant, carbon black dispersion provided excellent interaction in the ink mixture, hence no agglomeration to the heaters upon firing the heaters. In the three Comparative Examples, the latex resins prepared with nonionic polyethoxylated surfactant with a HLB number of lower than 16.5 agglomerated upon heating with the carbon black dispersion, hence causing excessive heater deposits and insulating the heaters. The grading of a 7 indicates heavy deposits, and when this occurs, the firing frequency of 1000 Hz decreases and the efficiency of the voltage applied is reduced significantly to 36 V.

Other modifications of the present invention may occur to those skilled in the art subsequent to a review of the present application and these modifications, including equivalents thereof, are intended to be included within the scope of the present invention.

What is claimed is:

1. A process for the preparation of an ink which comprises mixing an ink vehicle, a colorant and a latex polymer, and wherein said latex polymer is generated by the polymerization of a mixture of olefinic monomers, and which polymerization is accomplished in the presence of a nonionic polyethoxylated surfactant, and which surfactant possesses an HLB value of from about 16.5 to about 21.

2. A process in accordance with claim 1 wherein said latex polymer is generated from a mixture of about 1 to about 8 monomers, and said HLB value is from about 17.5 to about 20.

3. A process in accordance with claim 1 wherein said latex polymer is generated from a mixture of from about 2 to about 4 monomers.

4. A process in accordance with claim 1 wherein said olefinic monomer is a styrene acrylate, a styrene methacrylate, a methacrylate, or an acrylate.

5. A process in accordance with claim 1 wherein the latex polymer is a terpolymer, or a copolymer.

6. A process in accordance with claim 1 wherein said olefinic monomers are comprised of two monomers of an alkyl acrylate, and an alkyl methacrylate.

7. A process in accordance with claim 6 wherein the polymer glass transition temperature is from about 25° C. to about 80° C.

8. A process in accordance with claim 1 wherein said olefinic monomers are comprised of an alkyl acrylate, an alkyl methacrylate, a benzyl methacrylate, an acrylonitrile, a styrene functional monomer, an acid olefinic monomer, or mixtures thereof, and wherein said styrene functional monomer is selected from the group consisting of styrene, a-methylstyrene, 4-methylstyrene, 3-chlorostyrene, 2,5-dichlorostyrene, 4-bromostyrene, 4-tert-butylstyrene, and 4-methoxystyrene.

9. A process in accordance with claim 1 wherein said surfactant is a polyethoxylated amine surfactant with an HLB number of from about 17 to about 20.

10. A process in accordance with claim 1 wherein said surfactant possesses an HLB number of from about 17 to about 21.

11. A process in accordance with claim 1 wherein the nonionic surfactant is polyethoxylated octylphenol, polyethoxylated nonylphenol, polyoxyethylene stearyl ether, polyethoxylated hydrogenated tallow amide, or polyethoxylated glyceride.

12. A process in accordance with claim 1 wherein the nonionic polyethoxylated surfactant is a polyethoxylated octylphenol or a polyethoxylated glyceride.

13. A process in accordance with claim 1 wherein the nonionic surfactant is selected in an amount of from about 0.5 to about 10 weight percent based on the total weight percent amount of monomers, and nonionic surfactant.

14. A process in accordance with claim 1 wherein the colorant is a dye.

15. A process in accordance with claim 1 wherein the colorant is a pigment.

16. A process in accordance with claim 1 wherein the mixture of monomers selected enables a polymer of methyl methacrylate/butyl acrylate/acrylic acid.

17. A process in accordance with claim 1 wherein said colorant possesses a particle size distribution wherein at least about 90 percent of said colorant particles have a diameter of about 0.1 µm with the remaining colorant particles being of a diameter of about 1.0 µm.

18. A process in accordance with claim 1 wherein the latex polymer contains water.

19. A process in accordance with claim 1 wherein the amount of monomer selected is from about 90 to about 99.5, and the amount of nonionic polyethoxylated surfactant selected is from about 0.5 to about 10 weight percent based on the total weight percent of monomer and nonionic polyethoxylated surfactant selected to prepare polymer latex.

20. A process in accordance with claim 1 wherein ink additives are added to said ink.

21. A process in accordance with claim 20 wherein said additives are surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which additives are present in an amount of from about 0.01 to about 7 weight percent or parts based on the total ink components.

22. A process in accordance with claim 20 wherein said additives are comprised of a biocide, a humectant, or mixtures thereof.

23. A process in accordance with claim 1 wherein the vehicle is water, a glycol, or a mixture of glycols.

24. A high resolution printing process comprising applying in imagewise fashion to a substrate an ink composition obtained by the process of claim 1.

25. A process in accordance with claim 24 wherein the substrate is paper, and there is selected a printer having at least one nozzle of a channel width or diameter ranging from about 10 to about 40 microns and intercolor bleed is minimized or eliminated, and wherein said printing process is optionally accomplished with a 600 spi ink jet printer with a radiant heat assisting drying process.

26. A process in accordance with claim 1 wherein subsequent to polymerization there is formed a polymer selected from the group consisting of poly(styrene-butyl acrylate-acrylic acid), poly(styrene-acrylonitrile-acrylic acid), poly(styrene-butadiene-acrylic acid), poly(styrene-vinyl acetate-acrylic acid), poly(styrene-butyl acrylate-methacrylic acid), poly(styrene-butyl acrylate), poly(benzyl methacrylate-acrylic acid), poly(benzyl methacrylate-butyl acrylate), poly(styrene-ethyl acrylate-acrylic acid), poly(butyl methacrylate-methacrylic acid), poly(benzyl methacrylate-methacrylic acid), poly(butyl acrylate-methacrylic acid), poly(methyl methacrylate-butyl acrylate-acrylic acid), poly(methyl methacrylate-butyl acrylate), poly(methyl methacrylate-acrylonitrile-acrylic acid), poly(methyl methacrylate-butadiene-acrylic acid), poly(methyl methacrylate-vinyl acetate-acrylic acid), poly(methyl methacrylate-butyl acrylate-methacrylic acid), poly(ethyl methacrylate-acrylic acid), poly(benzyl methacrylate-acrylic acid), poly(methyl methacrylate-methyl acrylate-acrylic acid), poly(methyl methacrylate-ethyl acrylate-acrylic acid), and poly(butyl methacrylate-butyl acrylate).

27. A process in accordance with claim 1 wherein subsequent to polymerization there is formed a polymer selected from the group consisting of poly(methyl methacrylate-butyl acrylate-acrylic acid), poly(methyl methacrylate-butyl acrylate), poly(benzyl methacrylate-acrylic acid), poly(styrene-butyl acrylate-acrylic acid), and poly(benzyl methacrylate-methacrylic acid).

28. A process in accordance with claim 1 wherein subsequent to polymerization there is formed a polymer of poly(methyl methacrylate-butyl acrylate-acrylic acid).

29. A process in accordance with claim 1 wherein said vehicle is a solvent.

30. A process in accordance with claim 1 wherein said vehicle is water.

31. A process in accordance with claim 1 wherein said vehicle is a glycol.

32. A process in accordance with claim 1, wherein said surfactant is a polyethoxylated alcohol, a polyethoxylated alkylated phenol, a polyethoxylated amine, a polyethoxylated amide, a full ester of aliphatic polyol, or one or more long chain fatty acids at least one of which acids contains an ethoxylated substituent group.

33. A process in accordance with claim 1, wherein said surfactant possess an HLB value of 18.7.

34. A process in accordance with claim 1, wherein said surfactant possess an HLB value of 17.9.

35. A process in accordance with claim 1, wherein said surfactant possess an HLB value of 19.

36. A process for the preparation of an ink which comprises contacting an ink vehicle, a colorant and a latex polymer, and wherein said latex polymer is generated by the polymerization of at least two olefinic monomers, and which polymerization is accomplished in the presence of a polyethoxylated surfactant.

37. A process in accordance with claim 36 wherein said surfactant is a nonionic surfactant.

38. A process for the preparation of an ink which comprises mixing an ink vehicle, a colorant and a latex polymer, and wherein said latex polymer is generated by the polymerization of a mixture of olefinic monomers, and which polymerization is accomplished in the presence of a polyethoxylated surfactant, and which surfactant possesses an HLB value of from about 17 to about 20.

39. A process for the preparation of an ink which consists essentially of mixing an ink vehicle, a colorant and a latex polymer, and wherein said latex polymer is generated by the polymerization of a mixture of olefinic monomers, and which polymerization is accomplished in the presence of a nonionic polyethoxylated surfactant, and which surfactant possesses an HLB value of from about 18 to about 20.

* * * * *